United States Patent [19]

Stramel

[11] Patent Number: 5,567,754
[45] Date of Patent: Oct. 22, 1996

[54] PIGMENTS WITH IMPROVED DISPERSIBILITY IN THERMOPLASTIC RESINS

[75] Inventor: Rodney D. Stramel, Edmond, Okla.

[73] Assignee: Kerr-McGee Corporation, Oklahoma City, Okla.

[21] Appl. No.: 518,372

[22] Filed: Aug. 23, 1995

[51] Int. Cl.$^6$ .............. C08K 5/101; C08K 3/22; C09C 1/36
[52] U.S. Cl. ............ 524/308; 524/310; 524/312; 524/317; 524/413; 523/200; 523/204; 106/428; 106/436
[58] Field of Search .............. 524/308, 312, 524/317, 413; 523/204, 200; 106/428, 903, 436

[56] References Cited

U.S. PATENT DOCUMENTS

| | | | |
|---|---|---|---|
| 3,728,142 | 4/1973 | Rudolph et al. | 106/300 |
| 3,754,956 | 8/1973 | Durrant et al. | 106/300 |
| 3,825,438 | 7/1974 | Pritchard et al. | 106/300 |
| 4,675,356 | 6/1987 | Miyata | 524/424 |
| 5,288,320 | 2/1994 | Decelles | 106/445 |

*Primary Examiner*—Paul R. Michl
*Assistant Examiner*—Olga Asinossky
*Attorney, Agent, or Firm*—Herbert M. Hanegan; J. Rodgers Lunsford, III

[57] ABSTRACT

Thermoplastic concentrates comprising inorganic pigments, such as titanium dioxide, treated with a partial ester polyol and unsaturated monocarboxylic acid treating agent, of the formula $R(OH)_xCOOR'$, wherein R is an alkyl or aryl radical containing from about 2 to about 20 carbon atoms, R' is an unsaturated alkyl radical containing from about 6 to about 20 carbon atoms, and x is a number from about 2 to about 6, are disclosed. Such treatment improves the dispersibility of the pigments in thermoplastic resins. The treatment also enables the production of thermoplastic concentrates comprising a high percentage of treated inorganic pigment dispersed in a thermoplastic resin.

46 Claims, No Drawings

PIGMENTS WITH IMPROVED DISPERSIBILITY IN THERMOPLASTIC RESINS

BACKGROUND OF THE INVENTION

1. Field of the Invention

The present invention relates to thermoplastic concentrates containing a high concentration of inorganic pigment and a method for their production. More specifically, the present invention relates to surface treatment of inorganic pigments for improved dispersibility in thermoplastic resins. Most specifically, the present invention relates to treating titanium dioxide pigments with a partial ester polyol and unsaturated monocarboxylic acid for increased concentration and dispersion in polyolefin resins.

2. Description of the Prior Art

Inorganic pigments, such as titanium dioxide for example, are used in a variety of thermoplastic resin-based consumer goods. It is known, however, that the quality of the properties that the inorganic pigment imparts to the resin, such as opacity, color, brightness, UV and thermal stabilization, and the like, depends significantly on how evenly and uniformly the pigment is dispersed in the resin, as well as on the amount of pigment that can be effectively incorporated into the resin. It is also known that the hydrophobic nature of such thermoplastic resins is incompatible with the hydrophilic nature of such inorganic pigments thus making it difficult to obtain good dispersion of the pigments in the resins, especially at high pigment concentrations greater than 50 percent by weight, as pointed out in U.S. Pat. No. 4,183,843, which disclosed the use of a polar phosphate ester surfactant on alumina trihydrate to lower the viscosity of polyester inorganic filler composites.

The chemical surface treatment of inorganic pigments to improve dispersibility in, and increase compatibility with, thermoplastic resins, is known in the art. For example, U.S. Pat. No. 4,209,430 discloses the treatment of inorganic pigments with phosphorylated polyenes, which are the reaction products of a phosphorylating agent and a polyolefinically unsaturated compound of at least 10 carbon atoms. The pigments thus treated are described as possessing improved pigment properties as well as improved dispersibility and a reduced tendency to yellow in thermoplastic polyolefins in which the treated pigments are dispersed.

U.S. Pat. Nos. 4,357,170 and 4,377,417 also disclose inorganic pigment treatments for reducing the yellowing tendency of polymeric compositions containing such pigments. According to these patents, treating pigmentary titanium dioxide with an additive system comprised of an organophosphate/alkanolamine addition product, alone or in combination with a polyol, results in a reduction of the tendency of the treated pigment to yellow in polymeric compositions. These patents, however, do not mention any improved dispersibility benefit afforded by such treatment.

Examples of inorganic pigment treatments to which improved dispersibility benefits have been ascribed include the treatment disclosed in U.S. Pat. No. 5,288,320, which is identical to GB patent No. 2,252,306. These patents teach the treatment of titanium dioxide with an ester or partial ester of a hydroxy compound containing from 1 to 6 hydroxyl groups and an aliphatic saturated monocarboxylic acid having between 10 and 12 carbon atoms. Also, U.S. Pat. No. 3,728,142 discloses the treatment of inorganic pigments with non-drying fatty acid-modified alkyd resins for improved pigment dispersibility in plastics. A further example of the surface treatment of inorganic pigments for improved dispersibility is found in U.S. Pat. No. 3,754,956, which discloses the treatment of titanium dioxide pigments with a liquid polylactone having terminal hydroxy groups. Still another method of treating titanium dioxide pigments to achieve good dispersion and optical properties is described in U.S. Pat. No. 4,235,768, which discloses the art of treating titanium dioxide pigments with an aqueous polymer solution containing carboxyl groups. Also, U.S. Pat. No. 5,318,625 teaches the treatment of inorganic pigments with organophosphate esters for improved dispersibility and for production of polymeric concentrates.

None of the aforementioned patents teaches either the treatment of inorganic pigments with a partial ester polyol and unsaturated monocarboxylic acid or the production therefrom of the thermoplastic concentrates which are the subject of this application.

SUMMARY OF THE INVENTION

The present invention provides inorganic pigments characterized by improved processibility and dispersibility in thermoplastic resins. The improved inorganic pigments, preferably titanium dioxide pigments, have deposited thereon at least one partial ester polyol and unsaturated monocarboxylic acid treating agent corresponding to the formula $R(OH)_xCOOR'$. In this formula, R is an alkyl or aryl radical containing from about 2 to about 20 carbon atoms, R' is an unsaturated alkyl radical containing from about 6 to about 20 carbon atoms, and x is a number from about 2 to about 6. The present invention further provides pigmented thermoplastic concentrates comprising a thermoplastic resin as a continuous phase and the above described partial ester polyol and unsaturated monocarboxylic acid treated inorganic pigment as a disperse phase.

DETAILED DESCRIPTION OF THE PREFERRED EMBODIMENTS

The inorganic pigments which can be subjected to treatment with the hereinafter described partial ester polyol and unsaturated monocarboxylic acid treating agents to provide the improved inorganic pigments of the present invention include any of the white or colored, opacifying or non-opacifying particulate inorganic pigments (or mineral pigments) known and employed in the surface coatings (e.g., paint) and plastics industries. For purposes of this present description, the term inorganic pigments is employed broadly to define materials which are particulate by nature and nonvolatile in use and typically are most usually referred to as inerts, fillers, extenders, reinforcing pigments and the like.

Representative but non-limiting examples of inorganic pigments which can be treated as herein described to provide the improved inorganic pigments of this invention include white opacifying pigments such as titanium dioxide, basic carbonate white lead, basic sulfate white lead, basic silicate white lead, zinc sulfide, zinc oxide, composite pigments of zinc sulfide and barium sulfate, antimony oxide and the like, white extender pigments such as calcium carbonate, calcium sulfate, china and kaolin clays, mica, diatomaceous earth and colored pigments such as iron oxide, lead oxide, cadmium sulfide, cadmium selenide, lead chromate, zinc chromate, nickel titanate, chromium oxide and the like. Of all the inorganic pigments useful in producing the improved inorganic pigments of the present invention, a most preferred pigment is that of pigmentary titanium dioxide.

In general, the preferred titanium dioxide pigment for use in preparing an improved pigment of this invention can be of either the anatase or rutile crystalline structure or some combination thereof. This pigment may be produced by way of various known commercial processes which are familiar to those of skill in this art but which processes do not form any part of the present invention. Thus, this particular pigment can be one produced by either the well known sulfate process or the well known vapor phase oxidation process. The former process, i.e., the sulfate process, typically involves the steps of leaching a titaniferous ore with sulfuric acid to produce a titanium sulfate solution, hydrolysis of the titanium sulfate to form a titanium dioxide precipitate and calcination of this precipitate in the presence of suitable additives to develop the desired crystalline structure in the final calcined titanium dioxide product. In the latter process, i.e., the vapor phase oxidation process, a titanium halide such as titanium tetrachloride is oxidized in the vapor phase at elevated temperatures to produce what is commonly referred to as raw titanium dioxide. This raw pyrogenic titanium dioxide product is then recovered, subjected to milling and classification operations and, following treatment to deposit various hydrous metal oxide coatings upon the pigment, subjected to a final milling step to provide a pigment of the desired particle size.

Typically, the final milling step will comprise the use of fluid energy milling techniques. These techniques involve conveying the pigment through a milling apparatus such as the fluid energy mills disclosed in U.S. Pat. Nos. 2,032,827 and 2,219,011 using one or more gaseous streams produced by jets of a milling fluid such as air or steam to effect collision between individual pigment particles and thus a reduction in size of such particles. Various additive materials may be incorporated into the pigment during the fluid energy milling either to improve the milling of the pigment as disclosed in U.S. Pat. No. 3,531,310 or to enhance particular chemical, physical, and optical properties of the resultant milled pigment as disclosed in U.S. Pat. No. 4,752,340. Representative but non-limiting examples of such additive materials include polyols such as glycerol, pentaerythritol trimethylolethane, trimethylolpropane and the like, fatty acids such as oleic acid, stearic acid and the like, trialkanolamines such as triethanolamine and the like and amine salts such as triethanolamine melonate triisopropanolamine succinate and the like.

The amounts of the above disclosed additive materials which can be employed may vary broadly. Such broad variance depends upon both the particular additive material employed and the particular purpose for which it is added. Thus, for example, additive materials employed as aids to the milling of the titanium dioxide pigment advantageously will be utilized in amounts ranging from about 0.05 to about 5.0 weight percent based on the weight of the pigment. However, amounts of additive materials, other than milling aids, employed to modify any one or more of the chemical, physical, or optical properties of the pigment typically may range from about 0.01 to about 10.0 weight percent based on the weight of the pigment.

Like the additive materials disclosed above, the partial ester polyol and unsaturated monocarboxylic acid treating agents employed to provide the improved titanium dioxide pigment and the other inorganic pigments of this invention can also be readily deposited onto this pigment during the fluid energy milling thereof. However, other convenient methods for treating the titanium dioxide and other inorganic pigments disclosed herein with the partial ester polyol and unsaturated monocarboxylic acid treating agent can be used. Such other methods include, for example, applying the treating agent to the pigments by spraying or otherwise mixing the treating agent with the dry pigments. Thus the treating agent can be applied to the pigments by addition of the treating agent to the pigments through the intensifier bar of a v-blender or by spraying the treating agent into a screw conveyor or paddle mixer containing the pigments.

As disclosed hereinabove, the partial ester polyol and unsaturated monocarboxylic acid treating agents useful in providing inorganic pigments of improved thermoplastic resin dispersibility include those compounds corresponding to the formula, $R(OH)_xCOOR'$. In this formula, R is an alkyl or aryl 2radical containing from about 2 to about 20 carbon atoms, advantageously from about 3 to about 12 carbon atoms, and preferably about 3 carbon atoms. R' is an unsaturated alkyl radical containing from about 6 to about 20 carbon atoms, advantageously from about 12 to about 18 carbon atoms, and preferably about 17 carbon atoms. X is a number from about 2 to about 6, preferably about 3. The alkyl or aryl radical, R, in this formula can be either a straight-chain, a branched-chain or a cyclic radical. Representative examples of such radicals include ethyl, n-propyl, isopropyl, butyl, isobutyl, n-pentyl, isopentyl, n-hexyl, phenyl, heptyl, nonyl, decyl, dodecyl, octyl, cyclohexyl radicals, and the like. The unsaturated alkyl radical, R', in this formula can also be either a straight-chain, branched-chain or cyclic radical. Representative examples of such radicals include decene, dodecylene, tetradecene, hexadecene, octadecene, and the like. Non-limiting examples of partial ester polyol and unsaturated monocarboxylic acid treating agents useful in preparing the improved inorganic pigments of the present invention include glycerol monooleate, ethylene glycol monooleate, pentaerythritol monolinoleate, glycerol monopalmitate, glycerol monolinoleate, glycerol monoricinolate and the like. The amount of partial ester polyol and unsaturated monocarboxylic acid employed to treat the inorganic pigments described hereinabove, and particularly titanium dioxide pigment, will be an amount sufficient to provide a treated pigment exhibiting a dispersibility in thermoplastic resins greater than that of the pigment prior to treatment. Broadly, the amount of the partial ester polyol and unsaturated monocarboxylic acid treating agent employed will be an amount ranging from about 0.1 to about 5 weight percent based upon the weight of the pigment, advantageously an amount ranging from about 0.3 to about 1.2 weight percent, and preferably about 0.75 weight percent.

The resulting partial ester polyol and unsaturated monocarboxylic acid treated inorganic pigments can be employed to readily and uniformly pigment a wide variety of thermoplastic resins. These include such well known classes of thermoplastic resins as polyolefin resins, acrylic resins, polyester resins, polyamide resins, epoxy resins, phenolic. resins, poly(vinylaromatic) resins, poly(vinylhalide) resins, polycarbonate resins, polyurethane resins, and the like. Representative, but non-limiting, examples of these various classes of thermoplastic resins include: polyolefin resins such as polyethylene, polypropylene, and the like; acrylic resins such as poly(acrylic acid), poly(methacrylic acid), poly(methylacrylate), poly(methylmethacrylate), and the like; polyester resins such as poly(ethylene terephthalate), poly(butylene terephthalate) and the like; polyamide resins such as nylon-6 and nylon-6,6, and the like; epoxy resins such as poly(epichlorohydrin/bisphenol A) and the like and esters thereof such as those prepared by the esterification of poly(epichlorohydrin/bisphenol A) with a fatty acid, resin acid, tall oil acid or mixtures thereof; phenolic resins such as those derived from the reaction of formaldehyde with phenol, resorcinol, cresol, p-phenylphenol, and the like; poly(vinylaromatic) resins such as polystyrene and copolymers thereof such as poly(styrene-acrylonitrile), poly(styrene-butadiene-acrylonitrile), and the like; poly(vinylhalide) resins, such as poly(vinylchloride), poly(vinylchloride/vinylidene chloride) and the like; polycarbonate resins such as those attained either by the phosgenation of dihydroxy aliphatic or aromatic monomers such as ethylene glycol, propylene glycol, bisphenol A (i.e., 4,4'-isopropylidene diphenol), and the like or by the base catalyzed transesterification of bisphenol A with diphenyl carbonate to produce bisphenol A polycarbonate; and polyurethane resins obtained by the reaction of di-or polyfunctional hydroxy compounds such as glycols or hydroxyl terminated polyesters and polyethers with di- or polyfunctional diisocyanates.

The amounts of the partial ester polyol and unsaturated monocarboxylic acid treated inorganic pigments of this invention which can be added directly to the above described thermoplastic resins can vary widely depending upon the intended end use for these resins. Thus, thin films sometimes will require very high pigment levels while thick paints may only require a very small percentage. Accordingly, the amount of the treated pigment employed can range from as little as about 1 weight percent to as much as about 80 weight percent based upon the weight of the thermoplastic resin.

In yet a further embodiment of the present invention, the partial ester polyol and unsaturated monocarboxylic acid treated inorganic pigments of the present invention have exhibited particular utility in the preparation of thermoplastic concentrates. Broadly, these thermoplastic concentrates will comprise a continuous phase constituting a thermoplastic resin and a disperse phase constituting the partial ester polyol and unsaturated monocarboxylic acid treated inorganic pigments of this invention. The continuous phase may comprise any of the thermoplastic resins hereinbefore described, including the polyolefin resins, acrylic resins, polyester resins, polyamide resins, epoxy resins, phenolic resins, poly(vinylaromatic) resins, poly(vinylhalide) resins, polycarbonate resins, polyurethane resins, and the like.

In preparing the thermoplastic concentrates of the present invention, the amount of pigment incorporated into the thermoplastic resin continuous phase can vary widely. In general, this amount will vary depending upon the level of pigmentation desired or required in the final or finished end product employing these thermoplastic concentrates as pigmenting vehicles, and the effectiveness of the processing equipment utilized to reduce, dilute or dissolve the thermoplastic concentrates in the thermoplastic resins used to produce the final or finished end products. Broadly, the thermoplastic concentrates of this invention may contain weight ratios of the treated inorganic pigment to the thermoplastic resin in which it is dispersed ranging from about 0.5:1 to about 5:1 advantageously, and about 3:1 to about 5:1 preferably. Within such ranges, the treated inorganic pigment of the present invention can be easily and uniformly dispersed or distributed throughout the thermoplastic resin employed as the continuous phase of the thermoplastic concentrate produced.

Processes and process equipment useful in the preparation of the above described thermoplastic concentrates are known and do not form any part of this aspect of this invention. Such known processes generally involve mixing and/or blending techniques utilizing equipment capable of handling high plastic viscosity materials. Illustrative of equipment typically employed in mixing and/or blending processes include various kneader type dispersers, such as the Banbury mixer, single and multi-roll mills, and the like. A more detailed description of such mixing and/or blending processes and the equipment which may be employed therein can be found in Kirk-Othmer, Encyclopedia of Chemical Technology, 2nd Ed., Vol. 15, pages 592–596.

The invention is further described and illustrated by the following examples. These examples represent specific embodiments of the invention and are not to be construed as limitations thereon.

EXAMPLE 1

A rutile titanium dioxide product of the Kerr-McGee Corporation of Oklahoma City, Okla. marketed under the trade designation CR-834 was prepared from the chloride process and was steam micronized with a polyol milling aid, specifically trimethylol ethane ("TME"). The particulate titanium dioxide was then dry treated with glycerol monooleate as a fine mist or spray at a concentration of about 0.75 percent by weight of pigment. Specifically, the titanium dioxide and glycerol monooleate were mixed in a v-blender in which the glycerol monooleate was added through the intensifier bar.

The dispersibility of the treated titanium dioxide as compared to untreated titanium dioxide was then determined. That is, the mixing bowl of a Brabender Plasticorder Model PL-2000 was loaded with 36.50g of a polystyrene resin marketed by the Dow Chemical Company under the trade designation STYRON®#615, 0.31g of zinc stearate as a lubricant, and 109.50g of the above described treated titanium dioxide. The bowl temperature was set at 140° C. and the blade speed at 150 rpm. The torque and temperature were then recorded vs. time. The procedure was repeated using untreated titanium dioxide in order to compare the dispersibility of the treated titanium dioxide with untreated titanium dioxide. The procedure was also repeated using glycerol monostearate as suggested in GB Pat. No. 2,252,306. The results of these tests are set forth in Table I below.

TABLE I

| Sample | Equilibrium Torque | Processing Temperature |
|---|---|---|
| 1 | 1,520 | 184 |
| 2 | 1,370 | 175 |
| 3 | 1,440 | 178 |

1. Titanium dioxide steam micronized with TME
2. Sample 1 treated with 0.75% glycerol monooleate
3. Sample 1 treated with 0.75% glycerol monostearate Improved processibility and dispersibility of the 75 percent pigment thermoplastic concentrate is demonstrated by the lower processing torque and temperature of the glycerol monooleate treated sample.

EXAMPLE 2

This example deals with steam micronizing glycerol monooleate onto the pigment. Titanium dioxide was prepared from the chloride process. The samples were steam micronized with glycerol monooleate. The torque and temperature profiles were then measured using the method discussed in Example 1. That is, a ternary mixture containing 36.5 g polystyrene (Dow Styron #/615 or other general purpose polystyrene) 0.31 g zinc stearate and 109.5 g of the above described treated titanium dioxide was prepared and loaded into the mixing bowl of a Brabender Plasticorder Model PL-2000 having Cam type blades. The bowl temperature was set at 140° C., and the blade speed at 150 rpm. The torque and temperature profiles were measured and the data are tabulated in Table II.

TABLE II

| Sample | Equilibrium Torque | Processing Temperature |
|---|---|---|
| 1 | 1,603 | 184 |
| 2 | 1,288 | 171 |

1. Micronized with TME
2. Micronized with 1.0% glycerol monooleate.

Again, improved processibility of the 75 percent pigment thermoplastic concentrate is demonstrated by the lower processing torque and temperature of the glycerol monooleate treated sample.

Thus, the present invention is well adapted to carry out the objects and obtain the ends and advantages mentioned as well as those inherent therein. While presently prepared embodiments of the invention have been described herein, it is to be understood that modifications and changes can be made in the treated pigments and concentrates of the present invention without departing from the spirit or scope of the invention as set forth in the following claims.

What is claimed is:

1. A pigmentary material comprising an inorganic pigment having deposited thereon a partial ester polyol and an unsaturated monocarboxylic acid treating agent corresponding to the formula $R(OH)_xCOOR'$ wherein R is an alkyl or aryl radical containing from about 2 to about 20 carbon atoms, R' is an unsaturated alkyl radical containing from about 6 to about 20 carbon atoms, and x is a number from about 2 to about 6; said partial ester polyol and unsaturated monocarboxylic acid treating agent being deposited upon said pigment in an amount of at least about 0.1 percent by weight based upon the weight of said pigment.

2. The pigmentary material of claim 1 dispersed in a thermoplastic resin.

3. The pigmentary material of claim 2 wherein said thermoplastic resin is a thermoplastic homopolymer resin selected from the group consisting of polyolefin, polyvinyl, polyacrylic, phenolic, alkyl, epoxy, nylon, polyurethane, phenoxy, polycarbonate and polyester resins.

4. The pigmentary material of claim 1 wherein R in said general formula is a monovalent alkyl or aryl radical containing from about 3 to about 12 carbon atoms.

5. The pigmentary material of claim 4 wherein R in said general formula is a monovalent alkyl radical containing about 3 carbon atoms.

6. The pigmentary material of claim 1 wherein R' is an unsaturated alkyl radical containing from about 12 to about 18 carbon atoms.

7. The pigmentary material of claim 6 wherein R' is an unsaturated alkyl radical containing about 17 carbon atoms.

8. The pigmentary material of claim 1 wherein x is about 3.

9. The pigmentary material of claim 1 wherein said inorganic pigment is titanium dioxide.

10. The pigmentary material of claim 1 wherein said partial ester polyol and unsaturated monocarboxylic acid treating agent is deposited upon said pigment in an amount ranging from about 0.1 percent to about 5 percent by weight.

11. The pigmentary material of claim 10 wherein said partial ester polyol and unsaturated monocarboxylic acid treating agent is deposited upon said pigment in an amount ranging from about 0.3 percent to about 1.2 percent by weight.

12. The pigmentary material of claim 11 wherein the amount of said partial ester polyol and unsaturated monocarboxylic acid treating agent deposited upon said pigment is about 0.75 percent by weight.

13. The pigmentary material of claim 12 wherein:

R is a monovalent alkyl radical containing about 3 carbon atoms;

R' is an unsaturated alkyl radical containing about 17 carbon atoms; and x is about 3.

14. The pigmentary material of claim 2 wherein said inorganic pigment is dispersed in said thermoplastic resin in an amount ranging from about 0.5 parts to about 5 parts by weight per 1 part by weight of said thermoplastic resin.

15. The pigmentary material of claim 14 wherein the amount of said inorganic pigment dispersed in said thermoplastic resin is in the range of from about 3 parts to about 5 parts by weight per 1 part by weight of said thermoplastic resin.

16. The pigmentary material of claim 2 wherein said dispersed pigment is present in an amount in the range of from about 33.33 percent to about 83.33 percent by weight based upon the combined weight of the thermoplastic resin and the inorganic pigment.

17. A process for preparing a pigmentary material comprising the steps of:

(a) depositing a partial ester polyol and an unsaturated monocarboxylic acid treating agent on an inorganic pigment material;

wherein said treating agent is of the formula $R(OH)_x$-COOR' wherein R is an alkyl or aryl radical containing from about 2 to about 20 carbon atoms, R' is an unsaturated alkyl radical containing from about 6 to about 20 carbon atoms, and x is a number from about 2 to about 6; and wherein said treating agent is deposited on said pigment material in step (a) in an amount in the range of from about 0.1 percent to about 5 percent by weight based on the weight of said pigment material.

18. The process of claim 17 wherein R is a monovalent alkyl or aryl radical having from about 3 to about 12 carbon atoms.

19. The process of claim 18 wherein R is a monovalent alkyl radical having about 3 carbon atoms.

20. The process of claim 17 wherein R' is an unsaturated alkyl radical having from about 12 to about 18 carbon atoms.

21. The process of claim 20 wherein R' is an unsaturated alkyl radical having about 17 carbon atoms.

22. The process of claim 17 wherein x is about 3.

23. The process of claim 17 wherein said pigment material is titanium dioxide;

24. The process of claim 17 wherein said treating agent is glycerol monooleate.

25. The process of claim 17 wherein said pigmentary material is dispersed in a thermoplastic resin.

26. The process of claim 17 wherein said treating agent is deposited on said pigment material in step (a) in an amount in the range of from about 0.3 percent to about 1.2 percent by weight based on the weight of said pigment material.

27. The process of claim 26 wherein said treating agent is deposited on said pigment material in step (a) in the amount of about 0.75 percent by weight based on the weight of said pigment material.

28. The process of claim 25 wherein the amount of said pigment material dispersed in said thermoplastic resin is in the range of from about 33.33 percent to about 83.33 percent by weight based on the combined weight of said pigment material and said thermoplastic resin.

29. The process of claim 25 wherein said pigment material is dispersed in said thermoplastic resin in an amount in the range of from about 0.5 parts to about 5 parts by weight per 1 part by weight of said thermoplastic resin.

30. The process of claim 29 wherein the amount of said pigment material dispersed in said thermoplastic resin is in the range of from about 3 parts to about 5 parts by weight per 1 part by weight of said thermoplastic resin.

31. A process for preparing a pigmentary material comprising the step of pretreating a pigment material wherein:

said pigment material comprises an inorganic pigment material which is treated by depositing a partial ester polyol and an unsaturated monocarboxylic acid treating agent thereon;

said treating agent corresponding to the formula $R(OH)_x\text{-}COOR'$ wherein R is an alkyl or aryl radical containing from about 2 to about 20 carbon atoms, R' is an unsaturated alkyl radical containing from about 6 to about 20 carbon atoms, and x is a number from about 2 to about 6; and said pretreated pigment material has deposited thereon an amount of said treating agent in the range of from about 0.1 percent to about 5 percent by weight based on the weight of said inorganic pigment material.

32. The process of claim 31 wherein R is a monovalent alkyl or aryl radical having from about 3 to about 12 carbon atoms.

33. The process of claim 32 wherein R is a monovalent alkyl radical having about 3 carbon atoms.

34. The process of claim 31 wherein R' is an unsaturated alkyl radical having from about 12 to about 18 carbon atoms.

35. The process of claim 34 wherein R' is an unsaturated alkyl radical having about 17 carbon atoms.

36. The process of claim 31 wherein x is about 3.

37. The process of claim 31 wherein said inorganic pigment material is titanium dioxide.

38. The process of claim 31 wherein said treating agent is glycerol monooleate.

39. The process of claim 31 wherein said thermoplastic resin is a poly(vinylaromatic) resin.

40. The process of claim 31 wherein said treating agent deposited on said inorganic pigment material is present in the range of from about 0.3 percent to about 1.2 percent by weight based on the weight of said inorganic pigment material.

41. The process of claim 40 wherein the amount of said treating agent deposited on said inorganic pigment material is about 0.75 percent by weight based on the weight of said inorganic pigment material.

42. The process of claim 39 wherein the amount of said pretreated pigment material dispersed in said thermoplastic resin is in the range of from about 33.33 percent to about 83.33 percent by weight based on the combined weight of said pretreated pigment material and said thermoplastic resin.

43. The process of claim 39 wherein said pretreated pigment material is dispersed in said thermoplastic resin in an amount ranging from about 0.5 to about 5 parts by weight per 1 part by weight of said thermoplastic resin.

44. The process of claim 43 wherein the amount of said pretreated pigment material dispersed in said thermoplastic resin is in the range of from about 3 parts to about 5 parts by weight per 1 part of weight of said thermoplastic resin.

45. The process of claim 31 wherein:

R is a monovalent alkyl radical having 3 carbon atoms;

R' is an unsaturated alkyl radical having 17 carbon atoms; and x is 3;

said inorganic pigment material is titanium dioxide; and the amount of said treating agent is in the range of from about 0.3 percent to about 1.2 percent by weight based on the weight of said inorganic pigment material.

46. The process of claim 45 wherein the amount of said treating agent is about 0.75 percent by weight based on the weight of said inorganic pigment material.

* * * * *

UNITED STATES PATENT AND TRADEMARK OFFICE
CERTIFICATE OF CORRECTION

PATENT NO. : 5,567,754
DATED : October 22, 1996
INVENTOR(S) : Rodney Stramel

It is certified that error appears in the above-indentified patent and that said Letters Patent is hereby corrected as shown below:

Column 4, line 13, delete "2" between "aryl" and "radical"

Signed and Sealed this

Fourteenth Day of October, 1997

Attest:

BRUCE LEHMAN

*Attesting Officer*     *Commissioner of Patents and Trademarks*